Patented Aug. 2, 1949

2,477,559

UNITED STATES PATENT OFFICE 2,477,559

METHODS OF PRODUCING RUTILE

Winfred J. Cauwenberg, Piney River, Va., and Herbert L. Sanders, Easton, Pa., assignors to American Cyanamid Company, New York, N. Y., a corporation of Maine No Drawing. Application October 17, 1946, Serial No. 703,712

5 Claims. (Cl. 23—202)

This invention relates to the preparation of rutile titanium dioxide by the calcination of an anatase precipitate under controlled conditions.

Titanium dioxide, within recent years, has become one of the outstanding white pigments used in the coating and allied industries. Its popularity is due mainly to its whiteness, high hiding power, high tinting strength, and ready dispersibility in a variety of vehicles. It has been prepared in the past largely by the hydrolysis, under carefully controlled conditions of titanium sulfate solutions containing iron, prepared by digestion of ilmenite (a native ferrous titanate) with sulfuric acid, followed by a reduction of all ferric iron to ferrous iron, removal of a part of the iron by crystallization as ferrous sulfate, clarification and adjustment of concentration; the hydrolysate is calcined, together with conditioning agents to produce the desired white pigment.

It is an established fact that, of the three crystal modifications (anatase, brookite, and rutile) in which titanium dioxide occurs, the rutile crystal modification because of its high refractive index possesses better hiding power and higher tinting strength than does the anatase structure. Ordinarily, upon calcination of the precipitate obtained by the hydrolysis of titanium sulfate, the calcined product has been of the anatase structure. It is well known that this anatase titanium dioxide may be converted to rutile by continued calcination at temperatures above 1000° C. However, the product so obtained is undesirable for use as a white pigment due to the fact that the excessive heat treatment greatly discolors the calcined product and sintering occurs during the additional calcination so that the product is mainly composed of relatively large crystal aggregates which are extremely difficult to break up during the subsequent milling and micropulverizing treatments.

Within recent years several methods have been developed for the production of rutile titanium dioxide by means of the addition of varying amounts of rutile seeding agents prior to calcination of the titanium sulfate hydrolysate obtained by the above-described method. These methods have overcome, to a large extent, the disadvantages of prior calcination treatments by permitting the use of substantially lower calcination temperatures.

The present invention affords an improved method of producing rutile titanium dioxide from a sulfate hydrolysate in the presence of separately prepared hydrated titanium dioxide seeding agents of this class having rutile crystal form or which exhibit rutile crystal formation upon calcination at relatively low temperatures.

The present invention is based on the concept of preparing a rutile titanium dioxide pigment by a double roasting or calcination of an anatase precipitate obtained by the hydrolysis of a titanium sulfate solution, the second calcination being in the presence of a rutile calcination seeding agent. The invention comprises an initial roasting of the anatase precipitate in the presence of a small amount of a fusible alkali metal salt, but terminating the roasting step before pigment properties are developed in the roasted material, and subsequently calcining the roasted material to effect the conversion thereof to the rutile crystal modification at temperatures not substantially higher than 1000° C. It has been found that the desirable mineralizing effect, which is obtained by calcination of hydrated titanium dioxide materials in the presence of alkali metal salts, may be obtained during the initial roasting treatment of the present invention. Removal of the alkali metal salt after termination of this initial roasting operation permits a relatively rapid conversion of the anatase titanium dioxide to the rutile crystal modification thereof at relatively low temperatures, i. e., temperatures not substantially greater than 1000° C.

As hereinbefore stated, by means of the initial roasting treatment at relatively low temperatures in the presence of a small amount of alkali metal salt, desirable mineralizing effects are obtained. Additionally, the crystal habit of the roasted material is not fixed so that the material, upon removal of the alkali metal salt, may thereafter be easily converted to rutile titanium dioxide by calcination in the presence of a rutile seeding agent at temperatures substantially lower than those which it has heretofore been necessary to employ or for a much shorter time at the calcination temperatures previously used. The final calcined rutile titanium dioxide is characterized by a considerably higher tinting strength and hiding power than rutile titanium dioxide pigments obtained by prior art methods.

The material obtained by the initial roasting operation contains from about 0.02% to about 0.8% of $SO_3$, depending on the roasting temperature which has been employed. For example, if the sulfate hydrolysate has been heated for about 6 hours at 700° C., the roasted product will contain about 0.6% of $SO_3$, while if the sulfate hydrolysate has been roasted for 1 hour at 900° C. the $SO_3$ content thereof will be about 0.02%.

While the sulfate hydrolysate may be roasted under various conditions, as for example it may be heated for about 5-6 hours at 600° C., it has been found that very satisfactory results are obtained when the sulfate hydrolysate is roasted for about 1 hour at 850° C. When the higher temperatures are employed, it will be seen that substantially all of the acid may be removed in about 1 hour. The roasted product is then slurried in water, filtered and washed substantially free of alkali metal salt, dried and calcined. During the filtering and washing operation, a small amount of flocculating agent such as HCl may be added to facilitate the operation.

Although the amount of alkali metal salt addition may be varied over a wide range, it has been found that the addition of less than 1% by weight of the salt based on the amount of $TiO_2$ present in the sulfate hydrolysate does not sufficiently inhibit crystal delineation in the roasted material. On the other hand, while amounts of alkali metal salt as high or higher than 10% by weight of the $TiO_2$ may be employed, it is not usually necessary to employ more than 1-2% of the salt to obtain the desired crystal delineation inhibition.

A titanium sulfate hydrolysate which has been given a preliminary roast according to the method of the present invention under the conditions described above is entirely unsuitable for commercial use as a white pigment. The roasted titanium dioxide, when washed substantially free of alkali metal salt and other soluble impurities, usually has a tinting strength not greater than 760 when evaluated by the National Lead Company method and a hiding power of from about 60 to about 77. These properties are quite comparable with those possessed by materials which are ordinarily used as extenders for titanium dioxide pigments, i. e., calcium sulfate, barium sulfate, and the like extenders whose tinting strength and hiding powers are entirely too low to make possible the use of these materials as commercial high-quality white pigments. The term "hiding power," which has been variously defined by the authorities, is employed in the present disclosure to indicate the area (in square feet) which is covered to obtain 98% hiding, of standard black and white hiding power charts, by 1 lb. of roasted material. The relative hiding power of the ordinary extenders is from about 30 to about 60 as compared with a value of from about 110 to about 125 for the more desirable titanium dioxide pigments.

In order that the roasted material may be converted to the rutile modification at ordinary calcination temperatures, a rutile seeding agent is added thereto either prior to the roasting treatment or before the calcination treatment. The seed material as has hereinbefore been stated, may be either a calcined titanium dioxide having rutile structure or an uncalcined hydrated titanium dioxide which either has a definite rutile crystal structure or which develops a definite rutile crystal structure upon calcination at a relatively low temperature, as for example at a temperature of 1000° C. or less. When the seed is to be added prior to the roasting operation, it may be added at any stage in the process subsequent to the precipitation of the hydrated titanium dioxide and prior to the roasting operation. It has been found, however, that somewhat improved results may be obtained when the rutile seed material is added subsequent to the roasting operation. When the rutile seed is to be added after the roasting operation but prior to the calcination treatment the procedure, in other respects, remains the same. A part of the rutile seed may be added prior to the roasting operation and a part prior to the calcination operation if so desired. In case all of the rutile seed is to be added after the roasting operation, it may be added prior to washing or after washing the roasted oxide.

The amount of rutile seed used in the process of the present invention may vary within wide limits. While in general it is preferable to use about 5% of the seed material based on the total weight of the titanium dioxide to be calcined, smaller and larger percentages may be used. As little as 1% or less has been found to be effective, while there is obviously no upper limit to the amount of seed material which may be employed.

The actual amount of rutile seed used depends upon the amount of rutile conversion desired and also upon the activity of the seed. The activity of the seed in turn seems to depend, at least partly, upon the particle size of the seed. More calcined rutile seed is usually required for a given conversion than uncalcined seed. Uncalcined seeds also vary in their activity.

It is desired to place no limit upon the rutile conversion obtained. For certain purposes, relatively small conversion may be desired, and in other cases a substantially complete conversion may be desired. For example, it may be desirable to produce a pigment containing 15% rutile and 85% anatase, or a pigment containing 90% rutile and 10% anatase. It has been found that the hiding power and tinting strength of the pigment produced according to the process of the present invention increases proportionately as the conversion to rutile increases.

A small amount of an iron salt, such as ferric ammonium sulfate, or a small amount of a copper salt, such as copper sulfate, which salts decompose and form the oxides of the metals upon calcination, may be added either before or after roasting to prevent bluing or graying of the color of the pigment during the calcination operation. The preferred amount of iron is from about 0.01% to about 0.03%, calculated as $Fe_2O_3$ and based upon the weight of the titanium dioxide. If the uncalcined hydrated titanium dioxide already contains an appreciable amount of iron the amount to be added is correspondingly less than the 0.01% to 0.03%, so that the calcined pigment will contain from 0.01% to 0.03% $Fe_2O_3$. The preferred amount of copper is from 0.0004% to 0.002%, calculated as CuO.

In order that the specifc embodiments of the invention may be better understood, the following illustrative examples of the roasting operation, seed preparation, and calcination treatment are given below:

*Example 1—Roasting treatment*

Aqueous titanium dioxide pulp prepared by the hydrolysis of titanium sulfate solution was bleached and washed to remove any traces of impurities. To a portion of the washed filter cake containing 300 grams of titanium dioxide was added 2.0% of potassium carbonate based upon the weight of titanium dioxide. This mixture was dried at 110° C. and was roasted for 1 hour at 850° C. The roasted product was micropulverized, washed with dilute hydrochloric acid, filtered, rewashed with water, dried and micropulverized. The roasted material had a tinting strength of 740, its hiding power was about 70 and it had a definite brownish cast.

Example 2—Roasting treatment

To a portion of the relatively pure hydrated titanium dioxide of Example 1, containing 300 grams of titanium dioxide, was added 1% of potassium carbonate based on the weight of titanium dioxide. The mixture was dried and roasted for 1 hour at 900° C. The roasted material was treated similarly to that of Example 1 and the washed product had a tinting strength of 760, its hiding power was about 77 and it was of a very slightly blue hue.

Example 3—Roasting treatment

To a portion of the relatively pure hydrated titanium dioxide of Example 1, containing 300 grams of titanium dioxide, was added 2.0% of potassium carbonate based on the weight of the titanium dioxide. The mixture was dried at 110° C. and was roasted for 6 hours at 700° C. The product was treated similarly to the roasted material of Example 1 and had a tinting strength of 650, its hiding power was about 62 and was quite noticeably brownish in color.

Example 4—Preparation of seed

Titanium tetrachloride (or nitrate, or other monovalent anion salt) was slowly added to an equal volume of cold water while constantly stirring. The solution was allowed to cool to room temperature and then water was added until the concentration reached about 150 grams of titanium, calculated as titanium dioxide, per liter. During the dissolving of the titanium tetrachloride, a part of the combined hydrochloric acid was lost by volatilization. Prior to using, the solution was adjusted with hydrochloric acid so that it contained about 75% of the theoretical amount required for titanium tetrachloride. Metallic zinc was immersed in the solution until a small amount of the titanium (equivalent to 0.5 gram per liter, calculated as titanium dioxide) was reduced to the trivalent state. One liter of this solution was heated to 65° C. and added continuously, during 20 minutes, to 300 cc. of boiling water. Boiling was continued for 3 hours, and the precipitate thus formed was filtered out and washed with water until substantially free of chlorides.

The calcined titanium dioxide seed having rutile crystal structure may be prepared in any known manner, as, for example, by mixing the precipitate of Example 4 with a small amount of potassium carbonate and calcining.

Having described our invention and given examples illustrating methods of roasting the sulfate hydrolysate and preparing the rutile seed, examples illustrating the conversion of anatase structure to rutile structure are given below.

Example 5

A thoroughly washed aqueous pulp of a hydrated titanium dioxide precipitate, obtained by hydrolytic precipitation from a titanium sulfate solution, and containing 200 grams of titanium dioxide, was mixed with 20 grams of milled calcined titanium dioxide having the crystal structure of rutile and with a concentrated aqueous solution containing 4.4 grams of potassium carbonate. The mixture was dried and roasted for 1 hour at a temperature of about 850° C.

The roasted product was milled and slurried in sufficient water to give a pulp containing 15% solids, and 5 cc. of commercial 20° Bé. hydrochloric acid were added to the slurry. The solids were filtered out and washed substantially free of sulfates. The washed filter cake was then calcined for about 2½ to 3 hours at about 975° C.

The calcined pigment contained by X-ray analysis about 50% rutile and 50% anatase. The tinting strength of the hydroclassified and dry milled pigment was 1500, its hiding power was about 135 and the color was a bluish or a grayish white.

Tinting strength evaluations are based upon an arbitrary scale in which present commercial titanium dioxide of anatase crystal structure has a value of 1250.

The method of making these evaluations is described in "Physical and Chemical Examination of Paints, Varnishes, Lacquers, and Colors," by H. A. Gardner and G. G. Sward, 10th edition, pages 44 and 45, as the "National Lead Company Method."

Example 6

A thoroughly washed aqueous pulp of a hydrated titanium dioxide precipitate, obtained by hydrolytic precipitation from a titanium sulfate solution and containing 200 grams of titanium dioxide, was mixed with 25 grams of the precipitate of Example 4 containing 10 grams of titanium dioxide, with 0.24 gram of ferric ammonium sulfate containing .04 gram of ferric oxide and with a concentrated aqueous solution containing 4.2 grams of potassium carbonate. The mixture was dried and roasted for 1 hour at a temperature of about 850° C.

The roasted product was milled and slurried in sufficient water to give a pulp containing 15% solids. 5 cc. of commercial 20° Bé. hydrochloric acid were added and the solids were filtered out and washed substantially free of sulfates. The washed filter cake was then calcined for about 2½ to 3 hours at a temperature of about 975° C.

The product obtained had a tinting strength higher than the product of Example 5, and contained, according to X-ray analysis, about 80% rutile.

The color of the product obtained was somewhat better than that of Example 5, due to the inclusion of the ferric salt.

Example 7

Example 6 was repeated, except that the seeding precipitate was added to the roasted product before it was slurried. Results were essentially similar to that of Example 6.

Example 8

Example 7 was repeated without the iron addition. The product was somewhat grayer in color that the product of Example 7.

While in the examples the calcination is indicated to be for 2½ to 3 hours at a temperature of about 975° C., these conditions may be varied considerably. The calcination may be for a longer time at a somewhat lower temperature or for a shorter time at a somewhat higher temperature. In actual commercial operation the calcination may be continuous through a rotating horizontal kiln which is heated at the discharge end and in which, therefore, there is a gradual temperature change from one end of the kiln to the other.

The calcined pigment, obtained in accordance with any of the modifications of the present invention, may be either simply dry milled or wet milled, hydroclassified, treated with the usual reagents, filtered, dried and disintegrated in accordance with the present known procedures for producing the commercial titanium dioxide pigments having the anatase crystal structure.

The finished pigment of the present invention has many desirable properties, such as good resistance to chalking, excellent resistance to discoloration in white baking enamels, etc., but is characterized in the main by its exceptional hiding power and tinting strength. The hiding power and tinting strength of the product in which the conversion to rutile has been about 80% is in the neighborhood of 30% higher than that of present commercial titanium dioxide having the anatase crystal structure. When the conversion to rutile has been less, the advantage in hiding power and tinting strength is correspondingly less.

This is a continuation-in-part of our copending application, Serial No. 422,104, filed December 8, 1941, now abandoned.

What we claim is:

1. The method of preparing a white rutile pigment from a hydrolysate prepared from a titanium sulfate solution which comprises roasting the hydrolysate in admixture with at least 1% of an alkali metal salt at a temperature below 900° C., stopping the roasting after a period of time such that the roasted material has a tinting strength not in excess of 760 and contains not more than 0.8% of $SO_3$, washing the roasted material substantially free of alkali metal salt, and calcining the resultant product at a temperature not substantially higher than 1000° C. in the presence of a separately prepared rutile conversion agent of the class consisting of titanium dioxide showing a rutile crystal structure and hydrated titanium dioxide which shows a definite rutile crystal structure upon calcination at a temperature below 1000° C., whereby conversion of the roasted product to rutile is obtained under these calcination conditions.

2. The method of preparing a white rutile pigment from a hydrolysate prepared from a titanium sulfate solution, which comprises roasting the hydrolysate in admixture with at least 1% of an alkali metal salt at a temperature below 900° C., stopping the roasting after a period of time such that the roasted material has a tinting strength not in excess of 760 and contains not more than 0.8% of $SO_3$, washing the roasted material substantially free of alkali metal salt, and calcining the resultant product in the presence of separately prepared rutile at a temperature not substantially higher than 1000° C.

3. The method of preparing a white rutile pigment from a hydrolysate prepared from a titanium sulfate solution, which comprises roasting the hydrolysate in admixture with at least 1% of a potassium salt at a temperature below 900° C., stopping the roasting after a period of time such that the roasted material has a tinting strength not in excess of 760 and contains not more than 0.8% of $SO_3$, washing the roasted material substantially free of potassium salt, and calcining the resultant product at a temperature not substantially higher than 1000° C. in the presence of a separately prepared rutile conversion agent of the class consisting of titanium dioxide showing a rutile crystal structure and hydrated titanium dioxide which shows a definite rutile crystal structure upon calcination at a temperature below 1000° C., whereby conversion of the roasted product to rutile is obtained under these conditions.

4. The method of preparing a white rutile pigment from a hydrolysate prepared from a titanium sulfate solution, which comprises roasting the hydrolysate in admixture with at least 1% of a potassium salt at a temperature below 900° C., stopping the roasting after a period of time such that the roasted material has a tinting strength not in excess of 760 and contains not more than 0.8% of $SO_3$, washing the roasted material substantially free of potassium salt, and calcining the resultant product in the presence of separately prepared hydrated titanium dioxide having rutile crystal form, at a temperature not substantially higher than 1000° C.

5. The method of preparing a white rutile pigment from a hydrolysate prepared from a titanium sulfate solution, which comprises roasting the hydrolysate in admixture with at least 1% of a potassium salt at a temperature below 900° C., stopping the roasting after a period of time such that the roasted material has a tinting strength not in excess of 760 and contains not more than 0.8% of $SO_3$, washing the roasted material substantially free of potassium salt, and calcining the resultant product in the presence of a separately prepared hydrolysate titanium dioxide which shows a definite rutile crystal structure upon calcination at a temperature not in excess of 1000° C., the calcination of the roasted sulfate hydrolysate being carried out at a temperature not substantially higher than 1000° C.

WINFRED J. CAUWENBERG.
HERBERT L. SANDERS.

REFERENCES CITED

The following references are of record in the file of this patent:

UNITED STATES PATENTS

| Number | Name | Date |
|---|---|---|
| 2,213,542 | Booge | Sept. 3, 1940 |
| 2,397,430 | Pall | Mar. 26, 1946 |
| 2,406,465 | Keats | Aug. 27, 1946 |